Figure 1:
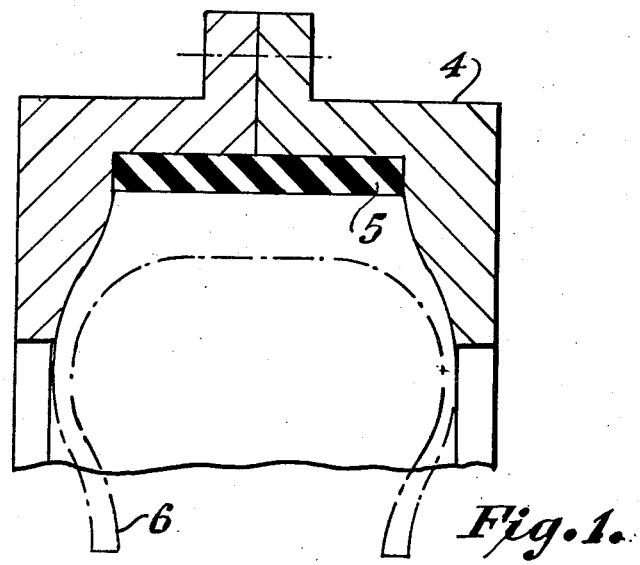

March 10, 1964  J. H. F. KENT  3,124,496
RE-TREADING OF TYRES
Filed May 26, 1961

Inventor:
Ian Herbert Farquharson Kent
By Baldwin & Wight
Attorneys

United States Patent Office 3,124,496
Patented Mar. 10, 1964

3,124,496
RE-TREADING OF TYRES
Jan Herbert Farquharson Kent, La Coupe, St. Martins, Jersey, Channel Islands, assignor to Kentredder Limited, Jersey, Channel Islands, a company of Channel Islands
Filed May 26, 1961, Ser. No. 112,777
3 Claims. (Cl. 156—95)

This invention relates to the re-treading of tyres.

It is concerned with a method in which the new tread or re-tread is provided by applying to the worn tread of the outer cover (or other tyre), usually referred to as "the crown," a band or strip of unvulcanised rubber, which is then caused to unite with the rubber by means of a moulding operation, without the use of solution or cement.

This moulding operation is carried out in a mould which does not enclose the complete outer cover but encloses only the tread band or strip and that part of the tyre itself, i.e. the crown, between the shoulders of the outer cover.

This mould consists of an annulus of metal having inwardly extending edge flanges to confine the tread band or strip and to prevent the latter from spreading.

In order to secure the desired width of tread, it is desirable to use an annular mould having comparatively deep edge flanges, this however gives rise to some difficulty in operating the apparatus because of it being necessary to introduce the outer cover into the smaller diameter mould (occasioned by the deep flanges) when the tread band or strip is already in position on the outer cover.

To overcome this difficulty it has been proposed to carry out the treading or re-treading operation by a method which consists in first placing the tread band or strip into the mould and subsequently inserting the outer cover or carcass of the tyre into the mould in which the tread band or strip is already in position by contracting the circumferential surface of the tyre.

Due to the fact that the normal unvulcanised rubber compound used for the tread band or strip is of a putty like consistency, when placing it inside the annular mould in order to retain it in position, it is necessary to press it firmly into engagement with the patterned surface of the mould. To do this in practice it means pressing the band or strip into position by means of a pressure roller until it has sunk sufficiently far into the mould pattern to stay in position. The outer cover is then superimposed which finally pushes the band or strip right home.

A further disadvantage of using present unvulcanised rubber mixes, particularly where fine vulcanised rubber "crumbs" or "buffings," which are a waste product of the tyre retreading process, are included in the mix to reduce costs, is that the tread bands made from such mixes have to be used within a short period before the material sets up and becomes difficult to handle for orthodox work. When such setting up occurs it is neccesary to re-masticate the material and thus also re-form the tread band which increases time and costs.

It is among the objects of the present invention to provide an improved method of treading or re-treading a tyre which eliminates the step of pressure rolling the tread band or strip into position in the mould, and thereby reduces the cost and the manpower required to tread or re-tread tyres.

It is further among the objects of the invention to provide an unvulcanised rubber mix for use in carrying out the method which provides a tread band which has the advantage of setting up and achieving a measure of resiliency.

According to the present invention a method of treading or re-treading a tyre by attaching to the outer cover or carcass a tread band or strip by means of a moulding operation, comprises forming the tread band or strip from an unvulcanised rubber mix which is such as to provide a band or strip which is inherently resilient, bending or otherwise shaping the band or strip into an annulus of approximately the required size, placing the so formed annulus in the mould, inserting the casing or carcass into the mould in such manner as to cause engagement between the tread band or strip and the mould surface pattern, and finally vulcanising the band or strip during which vulcanisation the band or strip is bonded to the outer cover or carcass.

The conditions used in the vulcanisation step will be dependent upon the composition used and particularly the accelerator activity. The selection of the most suitable vulcanisation conditions is well known in the art.

By resilient is meant a material which is capable of being bent or otherwise deformed under pressure but is capable of returning to its original shape on release of such pressure, it being understood that such material on being bent into, for example, a ring would be self-supporting in that, unlike say putty which would collapse, it would retain its shape.

In carrying out the invention a length of tread band or strip is formed as by an extrusion, calendering or moulding process from an unvulcanised rubber mix consisting of for example, 100 parts raw rubber, at least 20 parts vulcanised rubber crumbs or buffings, 37 parts carbon black, 4 parts of a softener, 4 parts zinc oxide, 3 parts stearic acid, 1 part of an antioxidant, 3 parts of an accelerator and 1.5 parts sulphur.

After processing, the tread band or strip is left to age for a minimum period of 14 days at a temperature in the range of 40–80° F.

Thus it will be seen that the unvulcanised tread bands formed improve with age and do not deteriorate as is the case with mixes at present in use.

Furthermore the rubber mix is such as to provide a band or strip which is inherently resilient and which, by virtue of its resilience, is capable of being placed within a tyre mould and to remain in such a position without the aid of an adhesive solution or cement or of any pressing operations that are usually required.

In accordance with the invention, the tread band or strip is bent into a ring or annulus and is then placed in the mould whereby, due to its resilience, it will tend to spring radially outwards to a position where its ends abut each other and its circumference will be in contact with the tread pattern of the mould. In this position the band will remain in situ without any assistance whatsoever.

The previously prepared outer cover or carcass is then inserted into the mould in such manner as to further force the tread band into engagement with the tread pattern of the mould. This is effected by spreading the tyre at its beads, that is to say by forcing the beads of the tyre apart in such manner as to reduce the apparent circumference of the tyre whereby it can be inserted into the mould after which the pressure is released to permit the tyre to expand and to regain its original circumference and thus engage the tread band.

In this position the tread band is vulcanised and a bond is effected between the tread band and the prepared surface of the outer cover or carcass.

Thus it will be understood that the method according to the invention provides a manner of treading or re-treading a tyre which eliminates the step of using a pressure operation to hold the tread band in position in the mould and thus reduces manufacturing costs and labour. Furthermore, the tread band or strip may be formed in long lengths which are afterwards cut to size to suit requirements or alternatively may be made in set lengths for a given tyre size.

The invention is diagrammatically illustrated by way of example in the accompanying drawing in which the single figure is a part cross-section showing one method according to the invention.

Referring to the drawing, there is shown a two-part mould 4 into which a tread band or strip 5 of inherently resilient material is placed, the tread band or strip 5 being first bent into a ring or annulus and being held in the mould 4 by virtue of its resilience. After positioning the tread band 5, the tyre carcass, indicated at 6, is inserted in the mould 4 in pressure contact with the tread band 5.

I claim:

1. A method of treading and re-treading tyres by attaching to the outer cover thereof a preformed tread band by means of a moulding process, which comprises bending said tread band into an annulus of approximately the required diametral size and of approximately the tread band width required on the tyre, placing the so formed annulus into an annular flanged mould with said band projecting in both directions from the central plane of the mould towards the mould flanges, spreading the beads of said tyre to reduce its effective diameter, inserting said tyre into said mould, releasing said beads to cause direct pressure contact between said outer cover and said tread band and between said tread band and the patterned surface of said mould, vulcanising said tread band during which vulcanisation said tread band is bonded to said outer cover, and finally removing said tyre after cooling from said mould, said tread band being formed from an unvulcanised and uncured rubber mix which is such that the resulting tread band is inherently resilient, thereby enabling said tread band to be held in position in the mould prior to insertion of the tyre therein by virtue of the resiliency of said tread band and without the use of adhesives or pressure operations.

2. A method as claimed in claim 1, in which said unvulcanised rubber mix comprises 100 parts raw rubber, at least 20 parts of vulcanised rubber crumb or buffings, 37 parts carbon black, 4 parts of a softener, 4 parts zinc oxide, 3 parts stearic acid, 1 part of an antioxidant, 3 parts of an accelerator and 1.5 parts sulphur.

3. A method as claimed in claim 2, in which after processing said tread band is left to age for a minimum period of 14 days at a temperature in the range 40–80° F.

References Cited in the file of this patent

UNITED STATES PATENTS

| | | |
|---|---|---|
| Re. 21,956 | Hawkinson | Nov. 25, 1941 |
| 2,292,286 | Owen | Aug. 4, 1942 |
| 2,497,226 | McNiell | Feb. 14, 1950 |
| 2,990,874 | Hawkinson | July 4, 1961 |

OTHER REFERENCES

Vanderbilt Rubber Handbook, 1958, published by R. T. Vanderbilt Co. Inc., N.Y., N.Y., p. 419, TS 1890, vol. 3, 1958. (Copy in Div. 67.)